United States Patent
Yamada et al.

(10) Patent No.: US 10,560,467 B2
(45) Date of Patent: Feb. 11, 2020

(54) NON-TRANSITORY COMPUTER-READABLE RECORDING MEDIUM STORING CONTROL PROGRAM, CONTROL METHOD, AND INFORMATION PROCESSING DEVICE

(71) Applicant: FUJITSU LIMITED, Kawasaki-shi, Kanagawa (JP)

(72) Inventors: Koji Yamada, Yokohama (JP); Kunihiko Yoshimura, Katsushika (JP); Kouta Tanabe, Zama (JP); Toshitaka Satomi, Yamato (JP); Ryusuke Masuoka, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 254 days.

(21) Appl. No.: 15/652,741

(22) Filed: Jul. 18, 2017

(65) Prior Publication Data

US 2018/0063172 A1 Mar. 1, 2018

(30) Foreign Application Priority Data

Aug. 26, 2016 (JP) .................. 2016-166305

(51) Int. Cl.
*H04L 29/06* (2006.01)
*G06F 21/55* (2013.01)
*G06F 21/57* (2013.01)

(52) U.S. Cl.
CPC ........ *H04L 63/1416* (2013.01); *G06F 21/554* (2013.01); *G06F 21/577* (2013.01);
(Continued)

(58) Field of Classification Search
CPC ............. H04L 63/1416; H04L 63/1433; H04L 63/0421; H04L 29/06; H04L 63/0407;
(Continued)

(56) References Cited

U.S. PATENT DOCUMENTS 7,583,187 B1 * 9/2009 Cheng .................. G06F 21/552
  340/3.1
9,032,478 B2 * 5/2015 Ballesteros ........... G06F 21/554
  726/3
(Continued)

FOREIGN PATENT DOCUMENTS

| EP | 3038005 A1 | 6/2016 |
| JP | 2003-248780 | 9/2003 |
| JP | 2007-264962 | 10/2007 |

OTHER PUBLICATIONS

Singapore Invitation to Respond to Written Opinion, Written Opinion and Search Report dated Feb. 21, 2018 for corresponding Singapore Patent Application No. 10201706105W, 8 pages.
(Continued)

*Primary Examiner* — Jayesh M Jhaveri
(74) *Attorney, Agent, or Firm* — Fujitsu Patent Center (57) ABSTRACT

A non-transitory computer-readable recording medium storing a control program causing a computer to execute processing, the processing includes: displaying a first node of a first type and a second node of a second type; receiving registration of a third node representing an access destination in association with the first node; receiving registration of a fourth node representing mask processing on information in association with the second node; receiving registration of a fifth node representing an information category in association with the second node; allowing transmission of information about a cyber attack event to the third node; and providing the information about the cyber attack event after executing the mask processing associated with the fourth node on information belonging to the information category associated with the fifth node, when the information about the cyber attack event is transmitted to the third node.

12 Claims, 9 Drawing Sheets

(52) U.S. Cl.
CPC ........ *H04L 63/1433* (2013.01); *G06F 21/552* (2013.01); *H04L 63/0407* (2013.01); *H04L 63/0414* (2013.01); *H04L 63/0421* (2013.01); *H04L 63/0428* (2013.01)

(58) Field of Classification Search
CPC ............. H04L 63/0414; H04L 63/0428; G06F 21/554; G06F 21/577; G06F 21/55; G06F 21/57; G06F 21/552
See application file for complete search history.

(56) References Cited

U.S. PATENT DOCUMENTS

| | | | |
|---|---|---|---|
| 2003/0163416 A1 | 8/2003 | Kitajima | |
| 2005/0015624 A1* | 1/2005 | Ginter | G06F 21/55 726/4 |
| 2015/0373043 A1* | 12/2015 | Wang | G06F 21/552 706/12 |
| 2018/0124090 A1* | 5/2018 | Koren | H04L 63/1416 |
| 2018/0365429 A1* | 12/2018 | Segal | G06F 21/577 |

OTHER PUBLICATIONS

Extended European Search Report dated Dec. 15, 2017 for corresponding European Patent Application No. 17183753.7, 6 pages.

\* cited by examiner

```xml
...
<!-- CYBER ATTACK ACTIVITY -->
<stix:Campaigns>
<stix:Campaign xsi:type="campaign:CampaignType" id="IPA:campaign_example">
<campaign:Title>TITLE OF CYBER ATTACK ACTIVITY</campaign:Title>
<campaign:Description>DESCRIPTION OF CYBER ATTACK ACTIVITY</campaign:Description>
<campaign:Short_Description>SHORT DESCRIPTION OF CYBER ATTACK ACTIVITY</campaign:Short_Description>
<campaign:Names>
<campaign:Name>NAME OF CYBER ATTACK ACTIVITY</campaign:Name>
</campaign:Names>
<!-- INTENTION OF ATTACK ACTIVITY -->
<campaign:Intended_Effect>
<stixCommon:Value xsi:type="stixVocabs:IntendedEffectVocab-1.0">Unauthorized Access</stixCommon:Value>
</campaign:Intended_Effect>
<!-- STATUS OF ATTACK ACTIVITY -->
<campaign:Status xsi:type="stixVocabs:CampaignStatusVocab-1.0">Historic</campaign:Status>
<!-- ATTACK TACTICS OF ATTACK ACTIVITY -->
<campaign:Related_TTPs>
<campaign:Related_TTP>
<stixCommon:TTP idref="IPA:ttp_example"/>
</campaign:Related_TTP>
</campaign:Related_TTPs>
<!-- INCIDENT OF ATTACK ACTIVITY -->
<campaign:Related_Incidents>
<campaign:Related_Incident>
<stixCommon:Incident idref="IPA:incident_example"/>
</campaign:Related_Incident>
</campaign:Related_Incidents>
...
```

NON-TRANSITORY COMPUTER-READABLE RECORDING MEDIUM STORING CONTROL PROGRAM, CONTROL METHOD, AND INFORMATION PROCESSING DEVICE

CROSS-REFERENCE TO RELATED APPLICATION

This application is based upon and claims the benefit of priority of the prior Japanese Patent Application No. 2016-166305, filed on Aug. 26, 2016, the entire contents of which are incorporated herein by reference.

FIELD

The embodiments discussed herein relate to a non-transitory computer-readable recording medium storing a control program, a control method, and an information processing device.

BACKGROUND

Cyber attacks such as unauthorized access through a network are made.

Related techniques are disclosed in Japanese Patent No. 4816920.

SUMMARY

According to an aspect of the invention, a non-transitory computer-readable recording medium storing a control program causing a computer to execute processing, the processing includes: displaying a first node of a first type and a second node of a second type; receiving registration of a third node representing an access destination in association with the first node; receiving registration of a fourth node representing processing on information in association with the second node; receiving registration of a fifth node representing an information category in association with the second node; allowing transmission of information about a cyber attack event to the third node; and providing the information about the cyber attack event after executing the processing associated with the fourth node on information belonging to the information category associated with the fifth node, when the information about the cyber attack event is transmitted to the third node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Since cyber attacks are made in various ways, it is effective to provide each other with information about various kinds of cyber attacks and share the information to take actions against cyber attacks.

For example, an authentication system of a security information disclosure site that releases security information about vulnerability of an application and actions against the vulnerability is provided in order to provide information about cyber attacks. In this authentication system, a network connection device is requested to transmit security authentication information, and is coupled in accordance with a result of comparing the security authentication information transmitted thereafter.

For example, it may be difficult to control a range of providing various information categories included in information about cyber attacks. For example, security information is directly disclosed to the network connection device coupled in accordance with the result of comparing the security authentication information. Upon providing the information about cyber attacks, an information category including personal information may be disclosed and a person may be specified.

For example, a method for controlling the range of providing an information category of the information about cyber attack may be provided.

In the following, any components having substantially identical or similar functions are denoted by the same reference sign, and any duplicate description thereof may be omitted in some cases. The following disclosure is merely exemplary and not intended to limit the embodiments. Further, embodiments described below may be combined as appropriate within a range of no contradiction.

Figure 1:
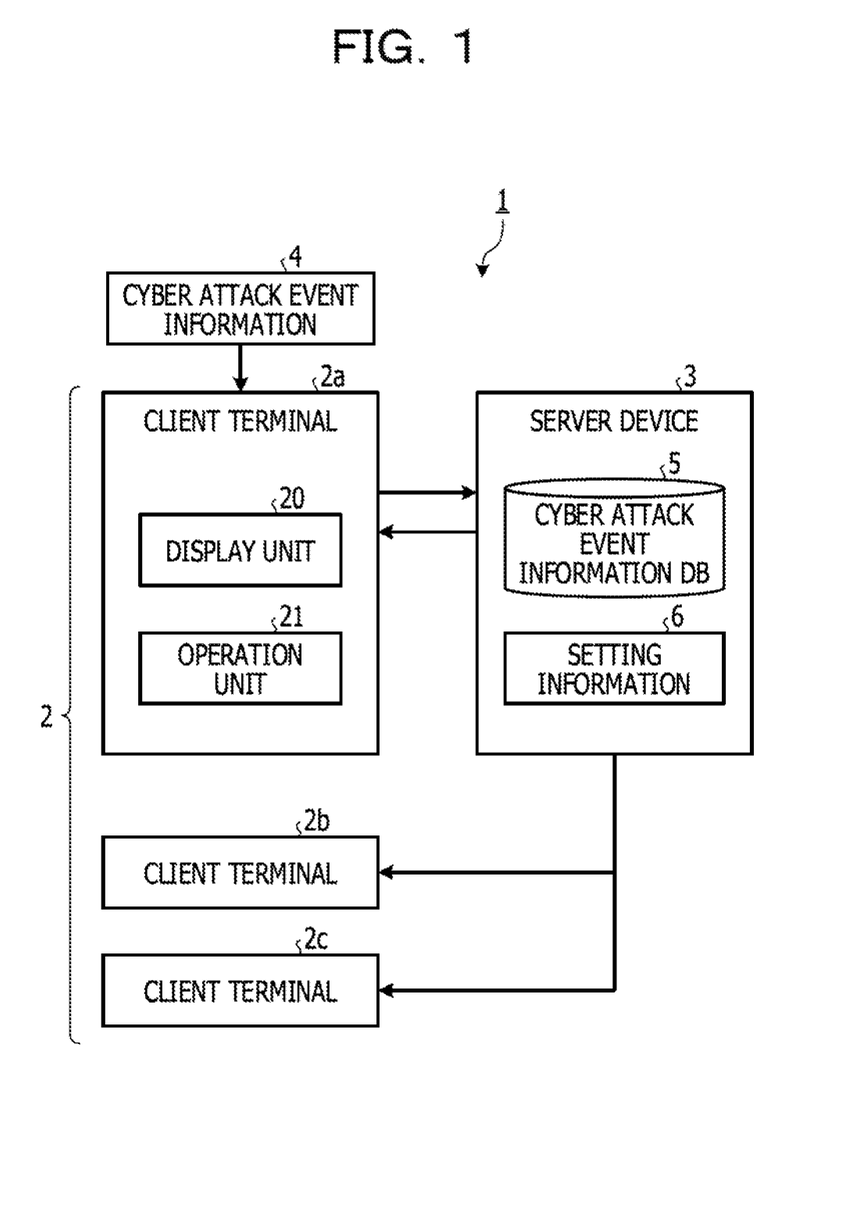
FIG. 1 illustrates an exemplary analysis support system.

FIG. 1 illustrates an exemplary analysis support system. As illustrated in FIG. 1, the analysis support system 1 includes a client terminal 2 and a server device 3. The client terminal 2 and the server device 3 are coupled to each other to be capable of performing communication through a communication network such as the Internet or a local area network (LAN).

The client terminal 2 is a terminal device used by a user, and may be, for example, a personal computer (PC) or a tablet terminal. The client terminal 2 includes a client terminal 2a configured to perform, to the server device 3, registration of cyber attack event information 4 about a cyber attack event, and setting of a rule (policy) on a range in which the cyber attack event information 4 is provided. Further, the client terminal 2 may include client terminals 2b and 2c configured to, in accordance with the policy, receive the provided cyber attack event information 4 registered to the server device 3.

The server device 3 transmits, to the client terminal 2a, display information about a setting screen on which the registration of the cyber attack event information 4 and the setting of a policy on the range of providing the cyber attack event information 4 are performed. The client terminal 2a displays, based on the display information, the setting screen on a display unit 20 such as a liquid crystal display. The client terminal 2a receives, through an operation unit 21 that is a user interface such as an operation key or a touch panel, operation instructions on the registration of the cyber attack event information 4 and the setting of a policy, and transmits, to the server device 3, the cyber attack event information 4 to be registered and information on the setting of a policy.

The server device 3 registers the cyber attack event information 4 received from the client terminal 2a to a cyber attack event information DB 5. The server device 3 registers, to setting information 6, setting of a policy on the range of providing the cyber attack event information 4 based on the information on the setting of a policy, which is received from the client terminal 2a.

The server device 3 reads the cyber attack event information 4 registered to the cyber attack event information DB 5 in response to a transmission request from the client terminal 2a or the client terminals 2b and 2c. The server device 3 provides the cyber attack event information 4 to the client terminals 2b and 2c in accordance with a policy registered to the setting information 6. In the analysis support system 1, the client terminals 2a to 2c may share the cyber attack event information 4 about cyber attacks and may proceed with analyze the cyber attacks.

The cyber attack event information 4 is information indicating a cyber attack activity (also referred to as Campaigns) related to a detected cyber attack event, such as detection of malware in an information processing system to be monitored. The cyber attack event information 4 may be described in, for example, a Structured Threat Information eXpression (STIX) language in accordance with Structured Threat Information eXpression (STIX), which is technical specification for describing an item related to a cyber attack activity including an event that characterizes a cyber attack.

For example, the cyber attack event information 4 may include, in addition to a cyber attack activity (Campaigns), an event content for each type (information category) of an attacker (Threat_Actors), an attack tactics (TTPs), a detection indicator (Indicators), an observation event (Observables), an incident (Incidents), an action (Courses_Of_Action), and an attack target (Exploit_Targets). The TTP is an abbreviation for Tactics, Techniques and Procedures. Content, in addition to a cyber attack activity, included in the cyber attack event information 4 may be information on part or all of an attacker, an attack tactics, a detection indicator, an observation event, an incident, an action, and an attack target.

Figure 2:
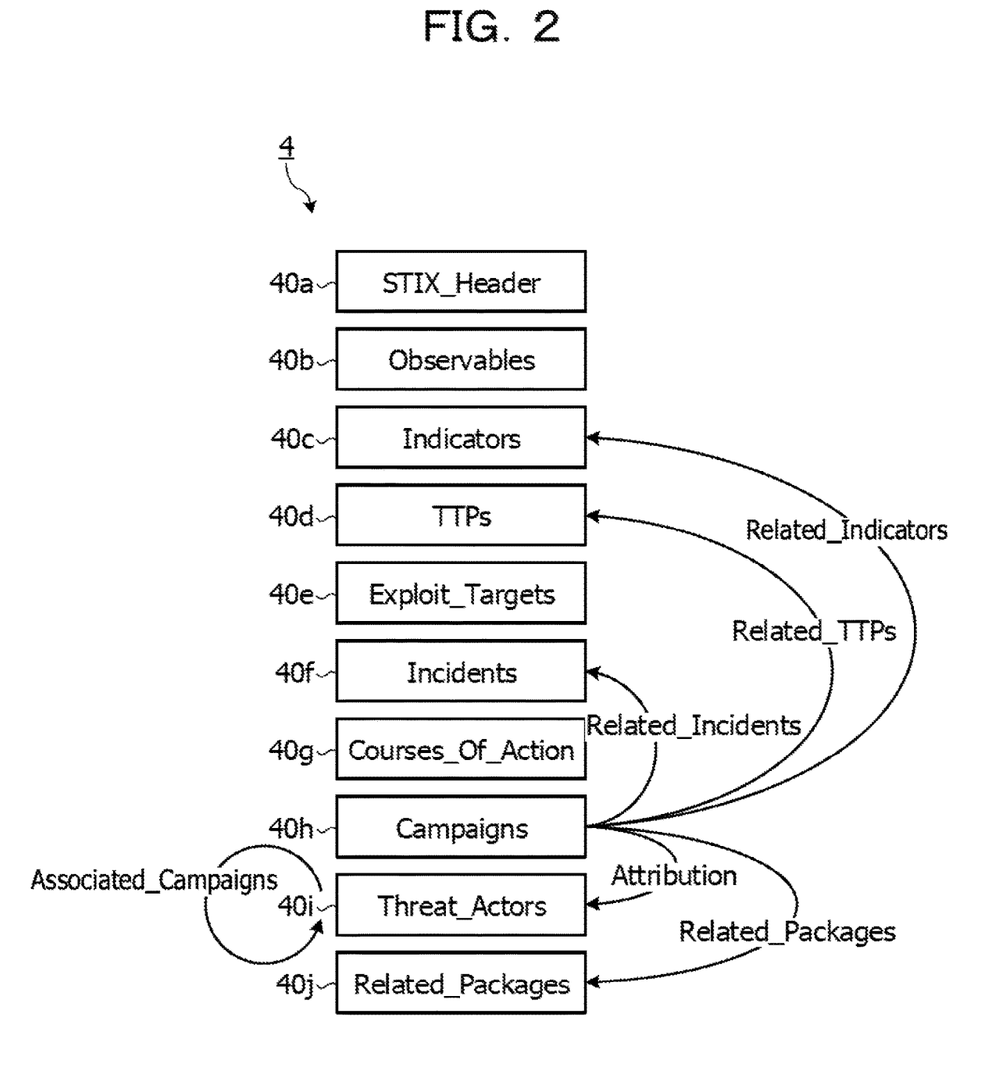
FIG. 2 illustrates exemplary cyber attack event information.

FIG. 2 illustrates exemplary cyber attack event information. As illustrated in FIG. 2, the cyber attack event information 4 includes fields 40a and 40j for additional information about STIX_Header and Related_Packages, and fields 40b to 40i for information about each item related to a cyber attack activity. In the cyber attack event information 4, the fields 40a to 40j are associated with each other through a link. For example, the field 40h for a cyber attack activity (Campaigns) is linked to the field for each item, such as the field 40c, 40d, 40f, 40i, or 40j.

The field 40h for a cyber attack activity (Campaigns) describes, for example, intention of the cyber attack activity of interest and the status of the attack activity. For example, the field 40h individually describes information about intention (Intended_Effect) of a cyber attack activity/an attacker. The field 40h individually describes the status of an attack activity (campaign:Status).

The field 40i for an attacker (Threat_Actors) individually describes information about a person/organization contributing to a cyber attack in terms of the type of an attacker of the cyber attack, motivation of the attacker, a level of the skill of the attacker, or intention of the attacker. For example, the field 40i describes, for example, information such as an IP address, mail address, or social network service account of an unauthorized access source (transmission source).

The field 40d for an attack tactics (TTPs) individually describes information about an attack pattern, a resource such as a malware or tool used by an attacker, an attack infrastructure of the attacker, or an attack target. The attack pattern (ttp:Attack_Pattern) may be described by using Common Attack Pattern Enumeration and Classification (CAPEC). For example, the field 40d may describe at least one of information about an IP address allocated to an information processing device involved in a cyber attack, and information about an access destination from the information processing device.

The field 40c for a detection indicator (Indicators) individually describes information indicating an indicator characterizing a cyber attack event. For example, the field 40c describes an indicator characterizing a cyber attack in addition to a tool used to produce the detection indicator from, for example, a type of a detection indicator, an observation event related to the detection indicator, an attack stage phase, or a signature.

The field 40b for an observation event (Observables) individually describes information indicating an event related to an operation observed in a cyber attack event. For example, the field 40b describes, as an event observed in a cyber attack, a file name, a hash value, a file size, a registry value, a service in operation, or a HTTP request. The description may use CybOX, which is a specification for describing an observation event of a cyber attack.

The field 40f for an incident (Incidents) individually describes information about a case occurring with a cyber attack in terms of, for example, a category describing the incident, persons (a reporter, a responder, a coordinator, and a victim) involved in the incident, an asset (a possessor, an administrator, and a place) damaged by the incident, direct/indirect influence by the incident, or the status of an action against the incident. For example, the field 40f individually describes information about the possessor or administrator of an asset damaged by an attacker of a cyber attack, and the place of the asset.

The field 40g for an action (Courses_Of_Action) individually describes information indicating an action against a threat of a cyber attack event in terms of, for example, the status of an action against the incident, the type of the action, the purpose of the action, influence of the action, cost of the action, or effectiveness of the action.

The field 40e for an attack target (Exploit_Targets) individually describes information indicating a weak point of an asset to be attacked in a cyber attack event, such as a weak point or the like of software or a system, which may be attacked in terms of, for example, vulnerability, the kind of the vulnerability, setting, or a configuration.

For example, the field 40e describes vulnerability by using Common Vulnerability and Exposures (CVE). The field 40e describes the kind of vulnerability by using Common Weakness Enumeration (CWE). The field 40e describes a security problem in setting by using Common Configuration Enumeration (CCE).

Figure 3:
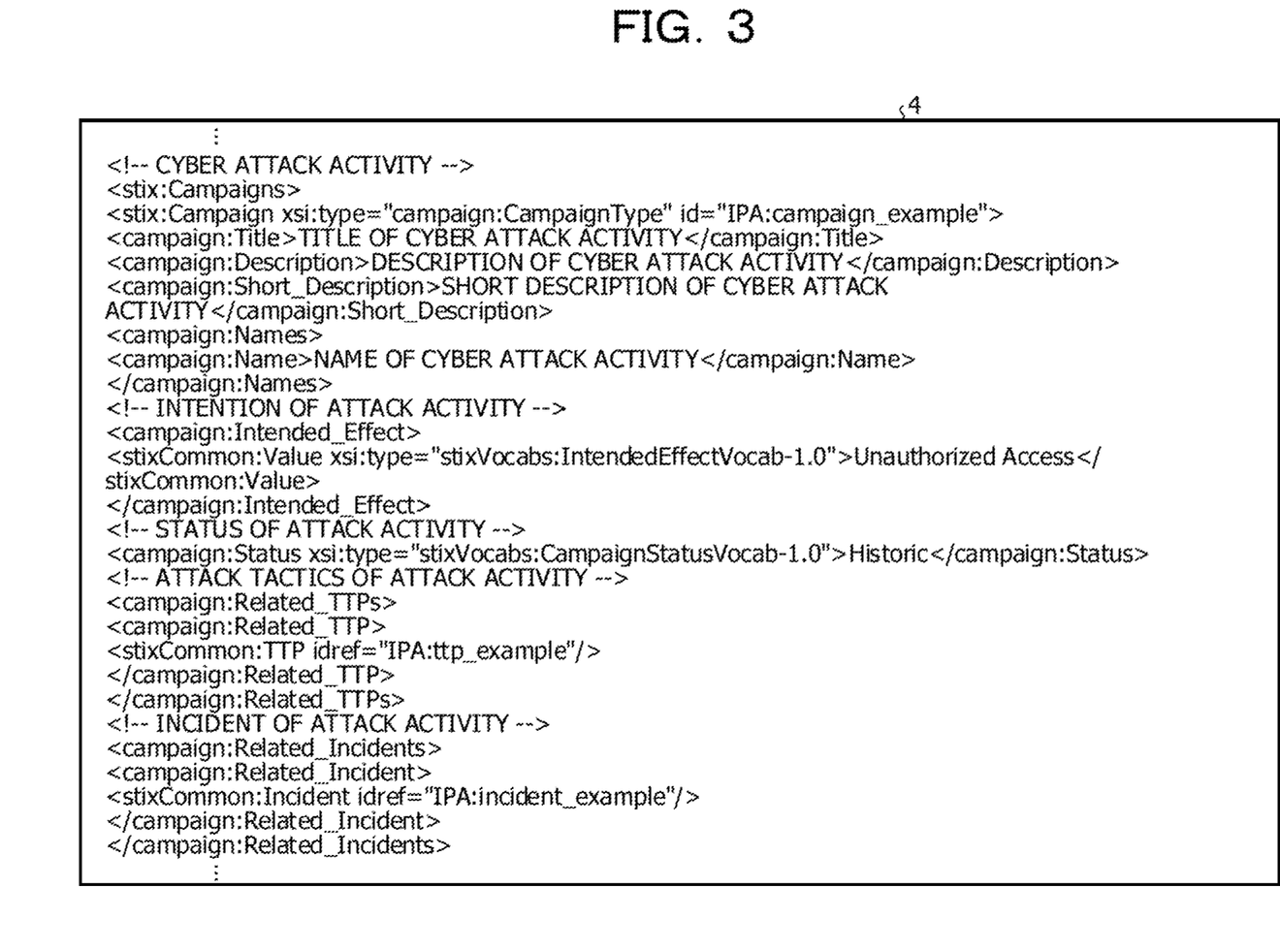
FIG. 3 illustrates exemplary cyber attack event information.

FIG. 3 illustrates exemplary cyber attack event information. As illustrated in FIG. 3, the cyber attack event information 4 employs an eXtensible Markup Language (XML) format to describe the above-described information in a tree structure in which tagged elements are hierarchized (formed in a nesting structure) from root elements. For example, the cyber attack event information 4 describes a tree structure in which a cyber attack activity, an attacker, an attack tactics, a detection indicator, an observation event, an incident, an action against the incident, an attack target or the like of a cyber attack event are set as elements, and information in each element is set as a subelement.

Figure 4:
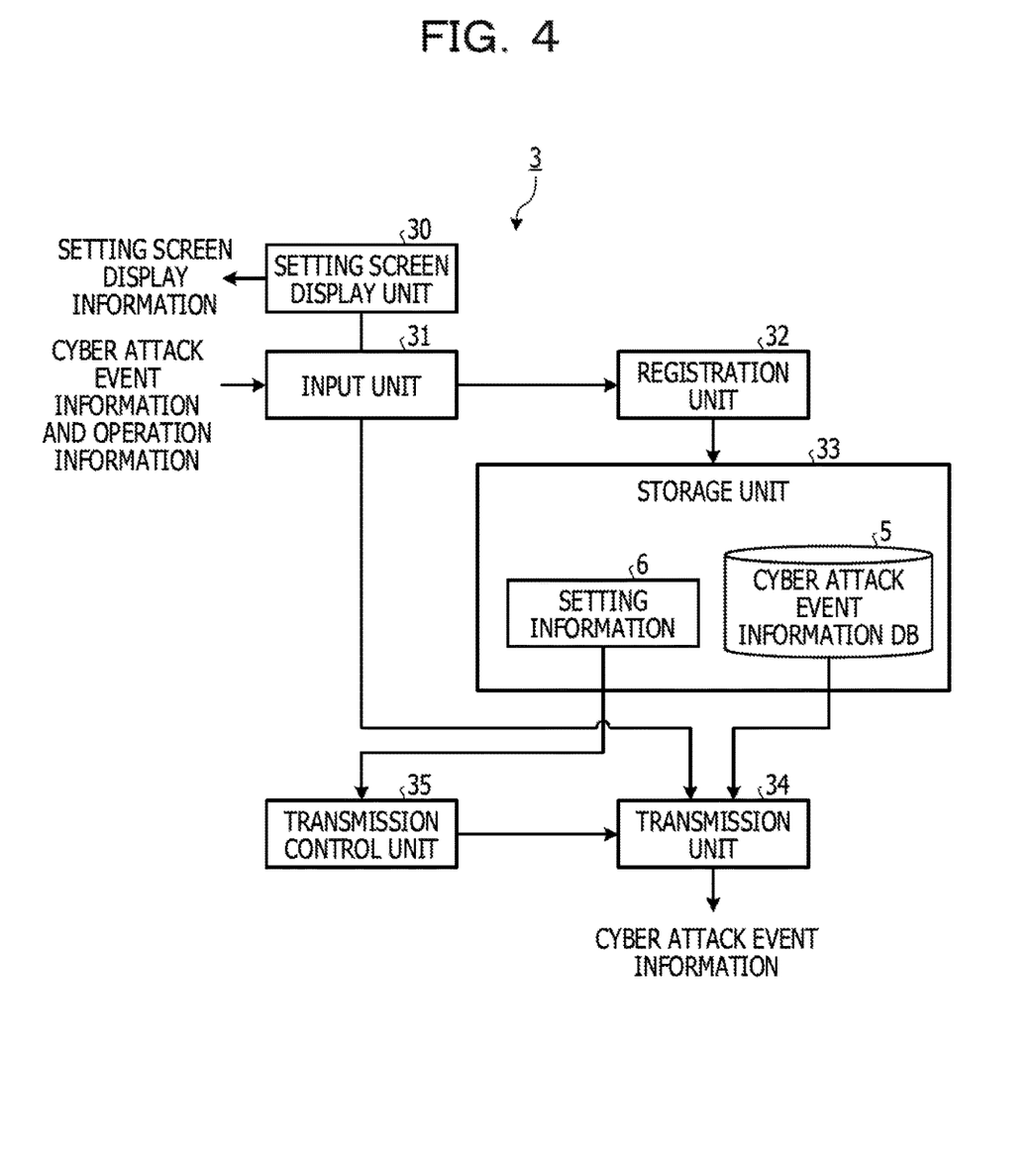
FIG. 4 illustrates an exemplary functional configuration of a server device.

FIG. 4 illustrates an exemplary functional configuration of the server device. As illustrated in FIG. 4, the server device 3 includes a setting screen display unit 30, an input unit 31, a registration unit 32, a storage unit 33, a transmission unit 34, and a transmission control unit 35.

The setting screen display unit 30 generates display information about the setting screen on which the registration of the cyber attack event information 4 and the setting of a policy on the range of providing the cyber attack event information 4 are performed, and transmits the display information to the client terminal 2a. The client terminal 2a displays, based on the display information transmitted from the setting screen display unit 30, on the display unit 20, the setting screen on which the registration of the cyber attack event information 4 or the setting of a policy on the range of providing the cyber attack event information 4 is performed.

The input unit 31 receives input of information transmitted from the client terminal 2 through, for example, the communication network. For example, the input unit 31 receives the cyber attack event information 4 as a registration target transmitted from the client terminal 2, and operation information.

The operation information is information corresponding to an operation instruction received by the client terminal 2 from the user through the operation unit 21. For example, the operation information may include the information about the setting of a policy on the range of providing the cyber attack event information 4, which is received by the client terminal 2a. The operation information may include information about a request to transmit the cyber attack event information 4 stored in the cyber attack event information DB 5, which is received by the client terminal 2a, or the client terminals 2b and 2c.

The input unit 31 outputs, to the registration unit 32, the cyber attack event information 4 as a registration target received from the client terminal 2a, and the information about the setting of a policy on the range of providing the cyber attack event information 4. The input unit 31 outputs, to the transmission unit 34, the information about the request to transmit the cyber attack event information 4 stored in the cyber attack event information DB 5, which is received from the client terminals 2a to 2c.

The registration unit 32 registers, to the cyber attack event information DB 5 in the storage unit 33, the cyber attack event information 4 as a registration target received from the client terminal 2a. The registration unit 32 registers to the setting information 6 in the storage unit 33 (updates the setting information 6 in the storage unit 33 with) the information about the setting of a policy on the range of providing the cyber attack event information 4 which is received from the client terminal 2a. The storage unit 33 may be a storage device such as a hard disk device 509 (refer to FIG. 9), and stores therein the cyber attack event information DB 5 and the setting information 6.

The cyber attack event information DB 5 is a database (DB) that allows registration and search of data. For example, the cyber attack event information 4 received from the client terminal 2a is given, for example, an identifier (ID) by the registration unit 32 and registered to the cyber attack event information DB 5.

The setting information 6 may be information indicating various setting contents input from the client terminal 2 through the input unit 31 and registered by the registration unit 32. For example, the setting information 6 may include the information about the setting of a policy on the range of providing the cyber attack event information 4. The setting of a policy in the setting information 6 may be performed with a policy on the entire analysis support system 1 or with a policy of each cyber attack event information 4. For example, in a case of the policy on each cyber attack event information 4, the information about the setting of a policy is registered, by the registration unit 32, to the setting information 6 together with the identifier (ID) of the cyber attack event information 4 registered to the cyber attack event information DB 5.

Figure 5:
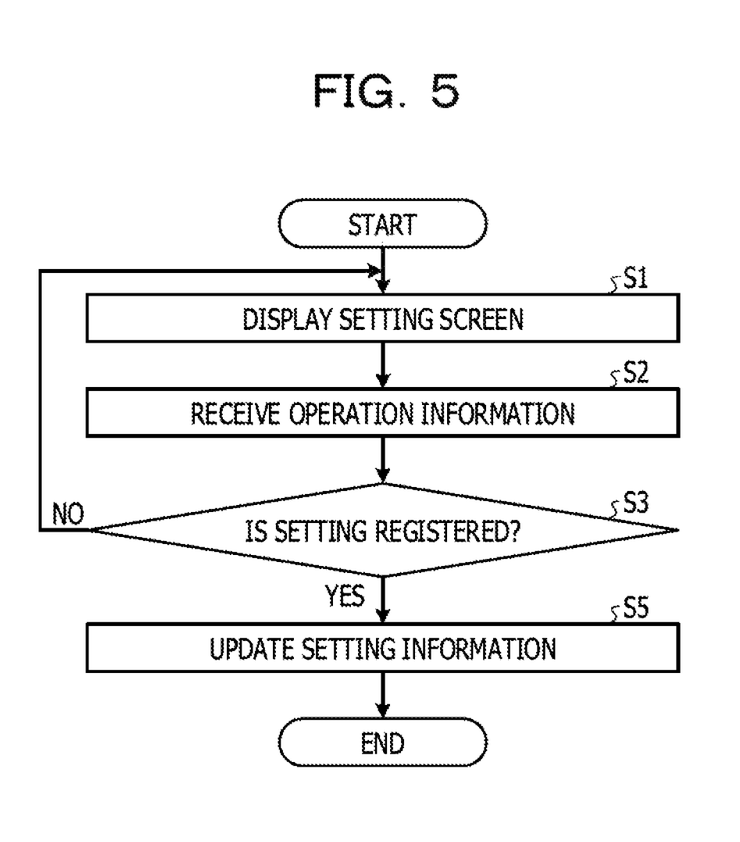
FIG. 5 illustrates an exemplary operation of the server device.

For example, registration of the setting of a policy on the range of providing the cyber attack event information 4 is performed. FIG. 5 illustrates an exemplary operation of the server device. FIG. 5 illustrates an operation on registration of the setting of a policy.

As illustrated in FIG. 5, when processing is started, the setting screen display unit 30 generates the display information about the setting screen on which the setting of a policy on the range of providing the cyber attack event information 4 is performed, and outputs the display information to the client terminal 2a. The client terminal 2a displays the setting screen on the display unit 20 based on the display information from the setting screen display unit 30 (S1). The input unit 31 receives the operation information input on the setting screen through the client terminal 2a (S2).

Figure 6:
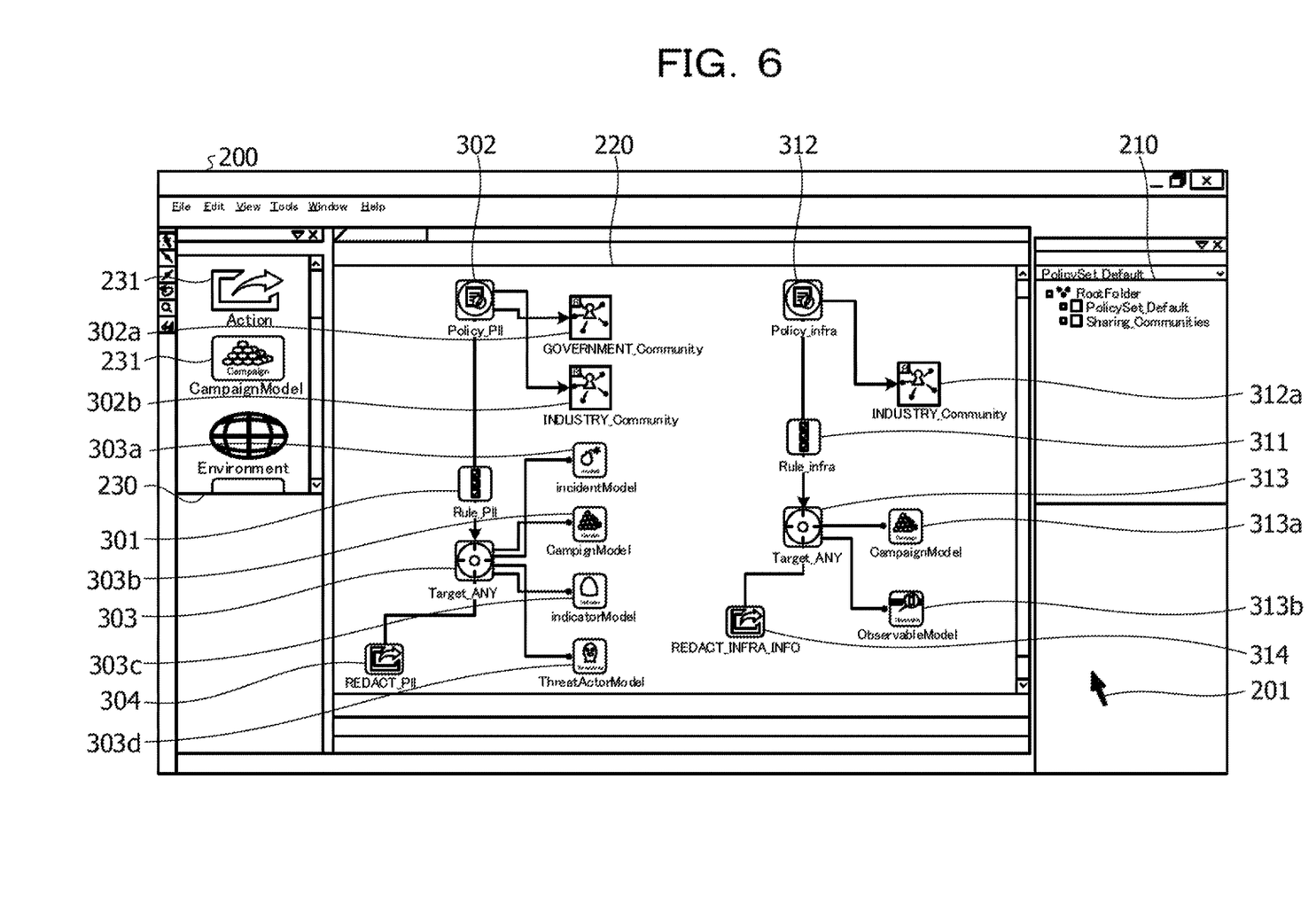
FIG. 6 illustrates an exemplary setting screen.

FIG. 6 illustrates an exemplary setting screen. As illustrated in FIG. 6, this setting screen 200 includes a console 201, a policy selection region 210, a policy display region 220, and a setting icon display region 230.

The console 201 may be, for example, a mouse cursor operated in response to the operation information received through the operation unit 21 by the client terminal 2a. The policy selection region 210 is a region in which a list of any policy set (registered) to the setting information 6 is displayed and selection is received.

The setting screen display unit 30 refers to the setting information 6 in the storage unit 33 and generates display information for displaying a list of any set policy in the policy selection region 210. In the case where there is a policy selected by the console 201 in the policy selection region 210, the setting screen display unit 30 reads the setting information 6 of the selected policy from the storage unit 33. The setting screen display unit 30 generates, based on the read setting information 6, display information for displaying the content of the selected policy in the policy display region 220.

The policy display region 220 is a region in which the content of a policy on the range of providing the cyber attack event information 4 is displayed in a tree structure from a root node to an end node. For example, in the policy display region 220, for example, a rule node 301 indicating one policy named "Rule_PII" is set as a root, and is coupled and associated, through a connection line, with an access destination rule node 302 that sets a policy of an access destination with respect to the root. The access destination rule node 302 is associated with access destination nodes 302a and 302b through connection lines. This tree structure form the rule node 301 to the access destination nodes 302a and 302b indicates an access destination to which the cyber attack event information 4 is allowed to be provided with respect to one policy named "Rule_PII".

For example, the rule node 301 as a root is coupled and associated, through a connection line, with an information category rule node 303 that sets a target of mask processing, for example, anonymization processing. The information category rule node 303 is associated, through connection lines, with a mask processing node 304 representing the content of the mask processing, and information category nodes 303a to 303d each representing an information category as a target of the mask processing. This tree structure from the rule node 301 as a root to the mask processing node 304 and the information category nodes 303a to 303d indicates, with respect to one policy named "Rule_PII", the content of the mask processing performed when the cyber attack event information 4 is provided, and the information category as a target of the mask processing.

Similarly, a rule node 311 representing one policy named "Rule_infra" is set as a root, and is coupled and associated, through a connection line, to an access destination rule node 312 that sets a policy of an access destination with respect to the root. The access destination rule node 312 is associated with an access destination node 312a through a connection line. This tree structure from the rule node 311 as a root to the access destination node 312a indicates an access destination to which the cyber attack event information 4 is allowed to be provided with respect to one policy named "Rule_infra".

The rule node 311 as a root is coupled and associated, through a connection line, to an information category rule node 313 that sets a target of the mask processing. The information category rule node 313 is associated, through connection lines, with a mask processing node 314 representing the content of the mask processing, and an information category nodes 313a and 313b each representing an information category as a target of the mask processing. This tree structure from the rule node 311 as a root to the mask processing node 314 and the information category nodes 313a and 313b indicates, with respect to one policy named "Rule_infra", the content of the mask processing performed when the cyber attack event information 4 is provided, and the information category as a target of the mask processing.

Further, the policy display region 220 may display the content of one policy to be set, for example, a tree structure including the rule node 301 as a root, or may display the contents of multiple policies side by side as illustrated in FIG. 6.

The setting icon display region 230 is a region displaying a setting icon 231 that performs setting of each node in the policy display region 220. The setting icon 231 performs the setting of a policy by being coupled to the access destination rule nodes 302 and 312, the information category rule node 303, or the information category rule node 313. For example, the user selects a certain setting icon 231 through the console 201. For example, the user performs an operation (for example, drag and drop operation) to couple the selected setting icon 231 to the access destination rule nodes 302 and 312, the information category rule node 303, or the information category rule node 313 in the policy display region 220.

For example, when the setting icon 231 representing an access destination named "GOVERNMENT_Community" is selected and coupled to an access destination rule node 302, the access destination node 302a corresponding to "GOVERNMENT_Community" is added to a policy of an allowed access destination. For example, when the setting icon 231 representing an access destination named "INDUSTRY_Community" is selected and coupled to the access destination rule node 302, an access destination node 302b corresponding to "INDUSTRY_Community" is added to the policy of an allowed access destination. In this manner, the policies of multiple access destinations are set to the access destination rule node 302.

For example, when the setting icon 231 representing the content of mask processing named "REDACT_PII" is selected and coupled to the information category rule node 303, the mask processing node 304 corresponding to "REDACT_PII" is added to a policy of mask processing. When the setting icon 231 representing the information category of an incident (Incidents) named "incidentModel" is selected and added to the information category rule node 303, an information category node 303a corresponding to the incident is added to the policy of mask processing. For example, when information category nodes 303b to 303d are added, the mask processing corresponding to the mask processing node 304 is applied in common with respect to multiple information categories such as a cyber attack activity, a detection indicator, or an attacker.

The content of a policy in the policy display region 220 is deleted when a node to be deleted is selected through the console 201 and a deletion instruction is performed. For example, when the access destination node 302a is selected through the console 201 and the deletion instruction is performed, a policy that allows an access destination named "GOVERNMENT_Community" is deleted.

Referring to FIG. 5, the input unit 31 determines, based on the operation information from the client terminal 2a, whether setting with a content displayed on the setting screen 200 is registered (S3). If there is no operation instruction to register the setting with the content displayed on the setting screen 200 (No at S3), the input unit 31 returns the process to S1 and continues the setting through the setting screen 200.

If there is an operation instruction to register the setting with the content displayed on the setting screen 200 (Yes at S3), the registration unit 32 registers the content of a policy displayed in the policy display region 220 to the setting information 6 and updates the setting information 6 (S5). For example, the registration unit 32 converts the content of a policy represented in a tree structure from a root node to an end node, into the corresponding XML format data of the tree structure, and registers the converted content to the setting information 6. If a policy is set for each cyber attack event information 4, the XML format data obtained through the conversion is, together with the identifier (ID) of the cyber attack event information 4, registered to the setting information 6.

Referring to FIG. 4, the transmission unit 34 reads the cyber attack event information 4 from the cyber attack event information DB 5 based on the information about a request to transmit the cyber attack event information 4 stored in the cyber attack event information DB 5, which is received from the client terminals 2a to 2c, and transmits the requested cyber attack event information 4.

The transmission control unit 35 may control the transmission of the cyber attack event information 4 by the transmission unit 34. For example, when the transmission unit 34 transmits the cyber attack event information 4, the transmission control unit 35 refers to a policy registered to the setting information 6 and performs control to transmit the cyber attack event information 4 within a providing range indicated by the registered policy.

Figure 7:
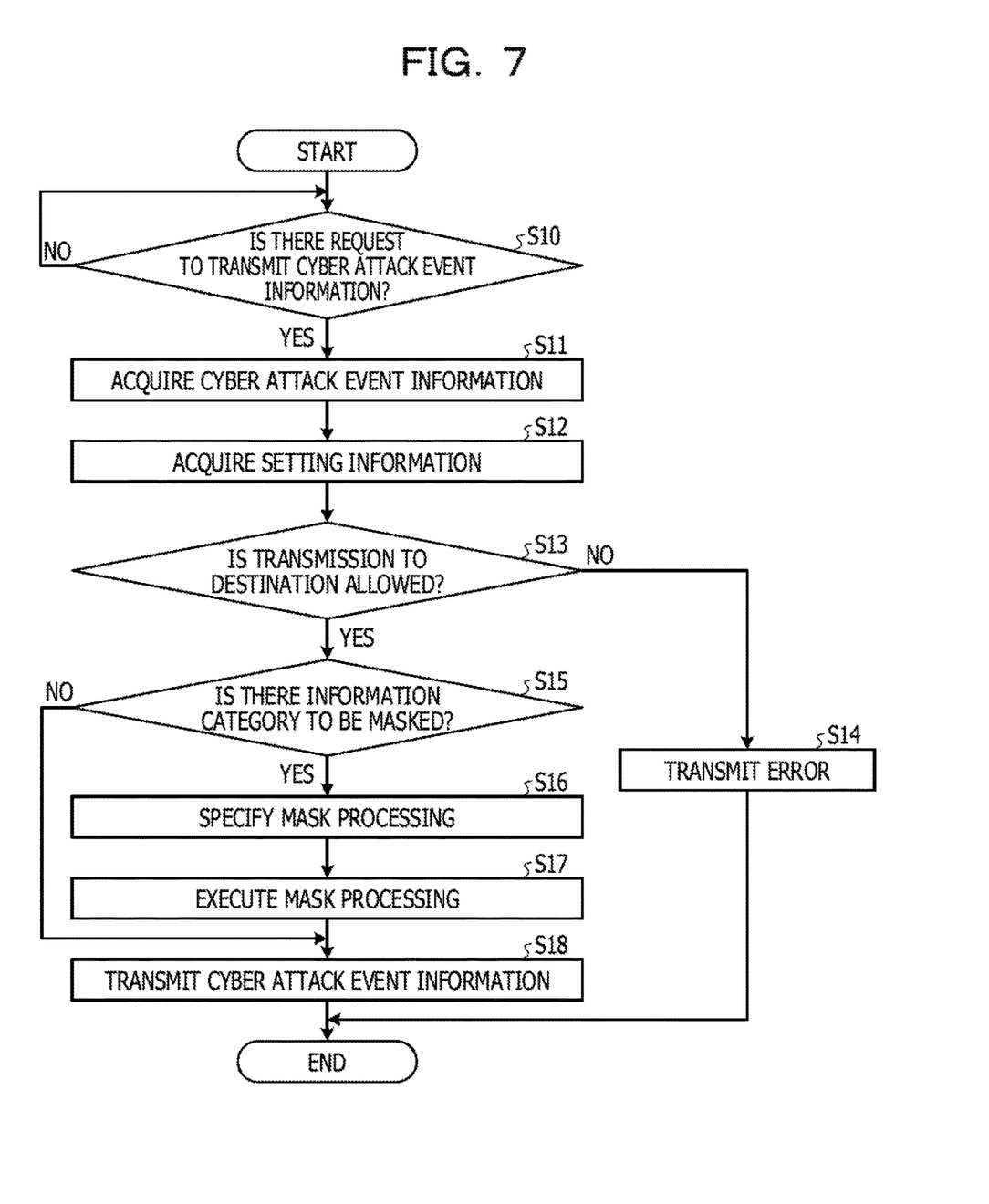
FIG. 7 illustrates an exemplary operation of the server device.

FIG. 7 illustrates an exemplary operation of the server device. FIG. 7 illustrates an operation of transmitting the cyber attack event information 4.

As illustrated in FIG. 7, when processing is started, the transmission unit 34 determines whether there is a request to transmit the cyber attack event information 4 (S10). If there is no transmission request (No at S10), the transmission unit 34 causes the process to stand by.

If there is the transmission request (Yes at S10), the transmission unit 34 acquires, from the cyber attack event information DB 5 based on an identifier or the like, the cyber attack event information 4 requested to be transmitted (S11). The transmission control unit 35 acquires the setting information 6 (S12) to obtain a policy of transmission of the cyber attack event information 4. If a policy is set for each cyber attack event information 4, the transmission control unit 35 acquires, from the setting information 6 based on the identifier of the cyber attack event information 4 requested to be transmitted, a policy registered together with the identifier.

The transmission control unit 35 determines, based on the acquired policy, whether a destination to which the transmission is requested is a destination to which the transmission is allowed (S13). For example, if the destination to which the transmission is requested is included in an access destination node coupled to an access destination rule node, the transmission control unit 35 determines that the destination is a destination to which the transmission is allowed.

If the destination is not a destination to which the transmission is allowed (No at S13), the transmission control unit 35 causes the transmission unit 34 to transmit an error (S14). Thus, if the destination to which the transmission is requested is not a destination allowed by a policy in the setting information 6, the error is transmitted and the transmission of the cyber attack event information 4 is rejected.

If the destination to which the transmission is requested is a destination to which the transmission is allowed (Yes at S13), the transmission control unit 35 determines, based on the acquired policy, whether there is an information category to be masked (S15). For example, if an information category node is coupled to an information category rule node, the transmission control unit 35 determines that there is an information category to be masked. If there is no information category to be masked (No at S15), the transmission control unit 35 advances the process to S18.

If there is an information category to be masked (Yes at S15), the transmission control unit 35 specifies mask processing for the information category to be masked, to the transmission unit 34, based on the acquired policy (S16). For example, the transmission control unit 35 specifies, to the transmission unit 34, the content of mask processing corresponding to a mask processing node coupled to an information category rule node, to be performed on an information category corresponding to an information category node. For example, the mask processing may include processing of anonymizing personal information such as a mail address or an IP address included in an information category as a target.

The transmission unit 34 executes the specified mask processing on the information category specified by the transmission control unit 35 (S17). The transmission control unit 35 causes the transmission unit 34 to transmit the cyber attack event information 4 (S18). If the mask processing is executed, the cyber attack event information 4 with the mask processing is transmitted.

Figure 8:
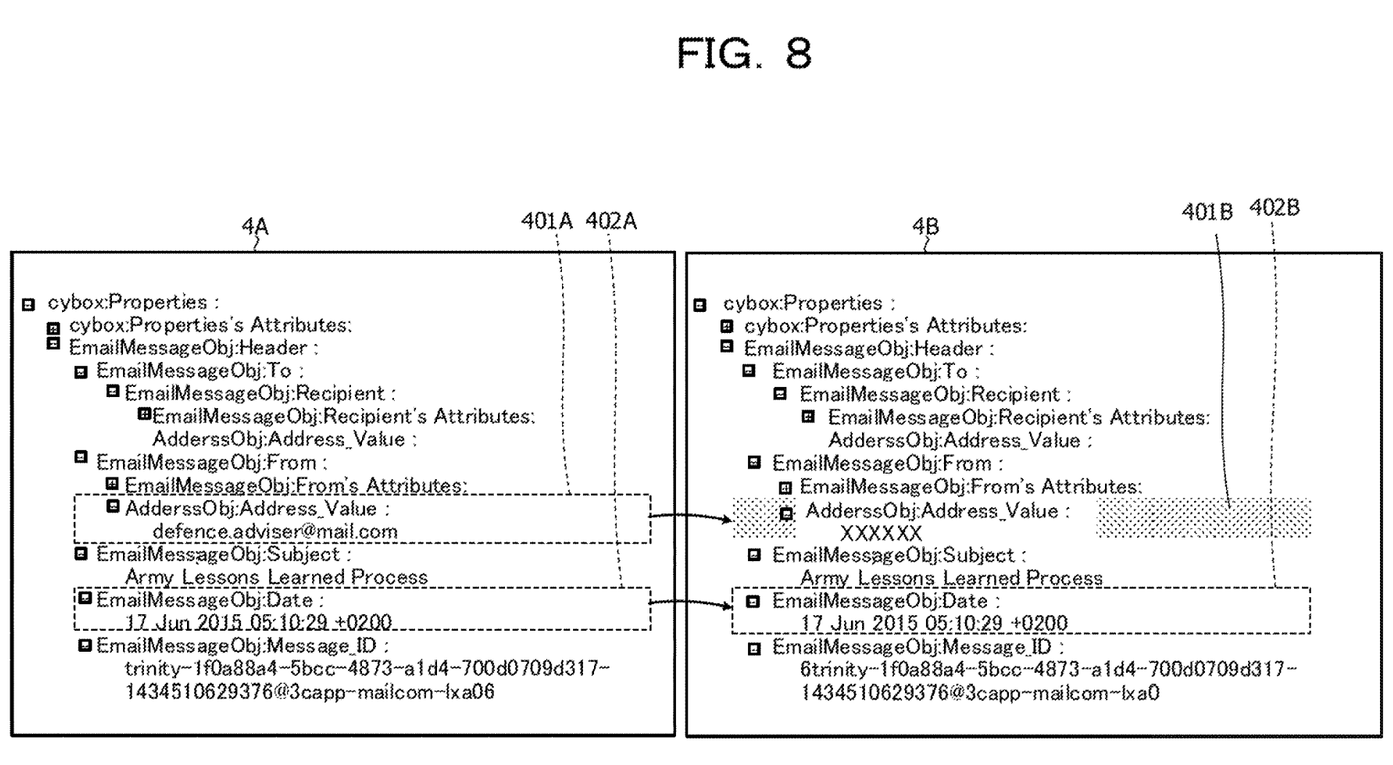
FIG. 8 illustrates exemplary mask processing of cyber attack event information.

FIG. 8 illustrates exemplary mask processing on cyber attack event information. In FIG. 8, cyber attack event information 4A is the cyber attack event information before the mask processing is provided, and cyber attack event information 4B is the cyber attack event information after the mask processing is executed. For example, mask processing set as a policy may be processing of anonymizing a mail address.

As illustrated in FIG. 8, when the mask processing is applied, a mail address 401A in the cyber attack event information 4A before the mask processing becomes an anonymized mail address 401B in the cyber attack event information 4B after the mask processing. Time information 402A for which no policy of mask processing is set is left as time information 402B, not anonymized in the cyber attack event information 4B after the mask processing.

In this manner, the cyber attack event information 4 is provided as it is, based on a policy in the setting information 6, to a destination to which transmission is allowed if no information category to be masked is set in the policy. With respect to an information category set to be masked in the policy, the cyber attack event information 4 with the mask processing executed on the information category is provided. In this manner, the server device 3 may control the range of providing each information category of the cyber attack event information 4 related to cyber attacks.

As described above, the server device 3 receives registration of a node representing an access destination such that the node is associated with an access destination rule node, and receives, from the client terminal 2a, registration of a mask processing node representing specific mask processing on information and an information category node representing an information category such that the mask processing node and the information category node are associated with an information category rule node. In the case where the cyber attack event information 4 is requested to be transmitted, the server device 3 allows transmission of the cyber attack event information 4 to an access destination indicated by the node registered in association with the access destination rule node. When the server device 3 transmits the cyber attack event information 4, the server device 3 performs control such that the specific mask processing corresponding to the mask processing node registered in association with the information category rule node is executed on the information belonging to the information category node registered in association with the information category rule node, and then provides the resultant information to a destination.

Thus, the server device 3 may control the range of providing an information category of the cyber attack event information 4 to the destination. For example, it may be possible to reduce leakage of personal information by masking an information category including personal information.

All or some of components of each illustrated device may be functionally or physically distributed or integrated in any units in accordance with, for example, various loads or use conditions.

All or any part of the various kinds of processing functions performed by the server device 3 may be executed on a CPU (or microcomputer such as micro processing unit (MPU) or micro controller unit (MCU)). All or any part of the various kinds of processing functions may be executed on a computer program analyzed and executed by a CPU (or microcomputer such as MPU or MCU), or on wired logic hardware. The various kinds of processing functions performed by the server device 3 may be executed through cooperation of multiple computers based on cloud computing.

For example, the analysis support system 1 of a client-server (C/S) model including the client terminal 2 and the server device 3 is provided. The analysis support system 1 may have a device configuration including the client terminal 2a alone, in which the client terminal 2a executes various kinds of processing functions of the server device 3.

Figure 9:
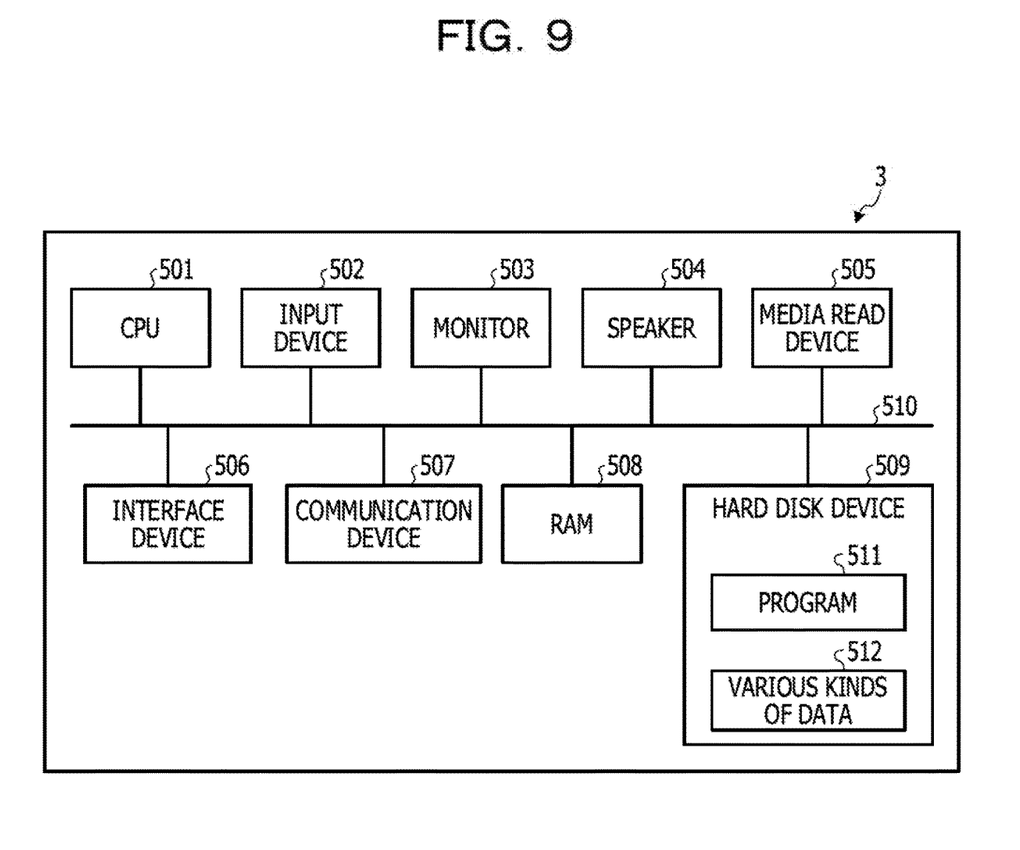
FIG. 9 illustrates an exemplary hardware configuration of the server device.

The above-described various kinds of processing may be achieved by a computer executing a computer program prepared in advance. For example, a computer (hardware) configured to execute a computer program having a function same as or similar to the above-described function may be provided. FIG. 9 illustrates an exemplary hardware configuration of the server device.

As illustrated in FIG. 9, the server device 3 includes a CPU 501 configured to execute various kinds of arithmetic processing, an input device 502 configured to receive data input, a monitor 503, and a speaker 504. The server device 3 includes a medium read device 505 configured to read, for example, a computer program from a storage medium, an interface device 506 for connection to various devices, and a communication device 507 for connection to achieve communication with external equipment in a wired or wireless manner. The server device 3 includes a RAM 508 configured to temporarily store various kinds of information, and the hard disk device 509. Each component (501 to 509) inside the server device 3 is coupled to a bus 510.

The hard disk device 509 stores therein a computer program 511 for executing various kinds of processing at the input unit 31, the registration unit 32, the transmission unit 34, and the transmission control unit 35 described above. The hard disk device 509 stores therein various kinds of data 512 to be referred to by the computer program 511, for example, the cyber attack event information DB 5. The input device 502 receives, for example, inputting of operation information from an operator. The monitor 503 displays, for example, various screens to be operated by the operator. The interface device 506 is coupled to, for example, a printing device. The communication device 507 is connected to the communication network such as a local area network (LAN) to transmit and receive various kinds of information to and from an external instrument through the communication network.

The CPU 501 performs various kinds of processing by reading the computer program 511 stored in the hard disk device 509, loading the computer program 511 onto the RAM 508, and executing the computer program 511. The computer program 511 may not have to be stored in the hard disk device 509. For example, the computer program 511 stored in a storage medium readable by the server device 3 may be read and executed. The storage medium readable by the server device 3 may be, for example, a portable recording medium such as a CD-ROM, a DVD disk, or a Universal Serial Bus (USB) memory, a semiconductor memory such as a flash memory, or a hard disk drive. The computer program 511 may be stored in a device coupled to a public line, the Internet, a LAN or the like to allow the server device 3 to read the computer program 511 from the device and execute the computer program 511.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a control program causing a computer to execute processing, the processing comprising:
displaying a rule node, a first node related to an access destination to which cyber attack event information is allowed to be provided and a second node related to one or more information categories to be a target of a mask processing;
when transmission of the cyber attack event information is performed based on a transmission request to transmit the cyber attack event information from a terminal as a transmission destination, performing, in a case where the transmission destination is included in the access destination provided by the first node coupled to the rule node, a mask processing on information which is included in the cyber attack event information and belongs to the one or more information categories provided by the second node coupled to the rule node; and
providing the cyber attack event information to the transmission destination, after the mask processing is performed.

2. The non-transitory computer-readable recording medium according to claim 1, wherein a plurality of nodes are allowed to be registered each as the access destination in association with the first node.

3. The non-transitory computer-readable recording medium according to claim 1, wherein in a case where a plurality of nodes are registered as the one or more information categories in association with the second node, the mask processing is performed on information which belongs all of the plurality of nodes as the one or more information categories, and the cyber attack event information is provided after the mask processing to the transmission destination.

4. The non-transitory computer-readable recording medium according to claim 1, wherein the mask processing is processing of anonymizing the information included in the one or more information categories.

5. A control method, comprising:
displaying, by a computer, a rule node, a first node related to an access destination to which cyber attack event information is allowed to be provided and a second node related to one or more information categories to be a target of a mask processing;
when transmission of the cyber attack event information is performed based on a transmission request to transmit the cyber attack event information from a terminal as a transmission destination, performing, in a case where the transmission destination is included in the access destination provided by the first node coupled to the rule node, a mask processing on information which is included in the cyber attack event information and belongs to the one or more information categories provided by the second node coupled to the rule node; and
providing the cyber attack event information to the transmission destination, after the mask processing is performed.

6. The control method according to claim 5, wherein a plurality of nodes are allowed to be registered each as the access destination in association with the first node.

7. The control method according to claim 5, further comprising:
executing, in a case where a plurality of nodes are registered as the one or more information categories in association with the second node, the mask processing on information which belongs all of the plurality of nodes as the one or more information categories; and providing the cyber attack event information after the mask processing to the transmission destination.

8. The control method according to claim 5, wherein the mask processing is processing of anonymizing the information included in the one or more information categories.

9. An information processing device, comprising:
a memory that stores a control program; and
a processor that performs a processing based on the control program,
wherein the processing includes:
displaying a rule node, a first node related to an access destination to which cyber attack event information is allowed to be provided and a second node related to one or more information categories to be a target of a mask processing;
when transmission of the cyber attack event information is performed based on a transmission request to transmit the cyber attack event information from a terminal as a transmission destination, performing, in a case where the transmission destination is included in the access destination provided by the first node coupled to the rule node, a mask processing on information which is included in the cyber attack event information and belongs to the one or more information categories provided by the second node coupled to the rule node; and
providing the cyber attack event information to the transmission destination, after the mask processing is performed.

10. The information processing device according to claim 9, wherein a plurality of nodes are allowed to be registered each as the access destination in association with the first node.

11. The information processing device according to claim 9, wherein in a case where a plurality of nodes are registered each as the one or more information categories in association with the second node, the mask processing is performed on information which belongs all of the plurality of nodes as the one or more information categories, and the cyber attack event information is provided after the mask processing to the transmission destination.

12. The information processing device according to claim 9, wherein the mask processing is processing of anonymizing the information included in the one or more information categories.

* * * * *